United States Patent
Gaal et al.

(10) Patent No.: US 9,503,231 B2
(45) Date of Patent: Nov. 22, 2016

(54) METHOD AND APPARATUS FOR IMPROVING UPLINK TRANSMISSION MODE CONFIGURATION

(75) Inventors: Peter Gaal, San Diego, CA (US); Wanshi Chen, San Diego, CA (US); Juan Montojo, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 103 days.

(21) Appl. No.: 13/290,979

(22) Filed: Nov. 7, 2011

(65) Prior Publication Data

US 2012/0113869 A1 May 10, 2012

Related U.S. Application Data

(60) Provisional application No. 61/411,887, filed on Nov. 9, 2010.

(51) Int. Cl.
*H04L 5/00* (2006.01)
*H04L 27/26* (2006.01)
(Continued)

(52) U.S. Cl.
CPC .......... *H04L 5/0023* (2013.01); *H04L 5/0048* (2013.01); *H04L 5/0091* (2013.01);
(Continued)

(58) Field of Classification Search
CPC .......... H04W 72/042; H04W 52/146; H04W 52/42; H04L 27/2626; H04L 5/0091; H04L 5/0023
USPC ................... 455/91, 522; 370/339, 232, 255
See application file for complete search history.

(56) References Cited

U.S. PATENT DOCUMENTS 8,280,320 B2 * 10/2012 Hwang et al. ................ 455/101
8,369,450 B2 * 2/2013 Khan et al. .................... 375/299
(Continued)

FOREIGN PATENT DOCUMENTS

CN 101378595 A 3/2009
EP 2346190 A2 7/2011
(Continued)

OTHER PUBLICATIONS

Notification of Transmittal of the International Search Report and the Written Opinion, International Search Report and Written Opinion in International Application No. PCT/US2011/059832 mailed Jun. 25, 2012.
(Continued)

*Primary Examiner* — Alpus H Hsu
*Assistant Examiner* — Anthony Luo
(74) *Attorney, Agent, or Firm* — Arent Fox LLP

(57) ABSTRACT

A method, an apparatus, and a computer program product for wireless communication are provided in which a first message to reconfigure an uplink transmission mode of a user equipment (UE) from a first uplink transmission mode to a second uplink transmission mode is transmitted. Further, a reconfiguration scheme to assure at least one of two or more second messages are recognizable by the UE during a transition period after transmission of the first message is implemented. In another example, a UE and eNB may be equipped to respectively transmit and receive a first message to reconfigure a SRS mode used by a UE. In such an aspect the first message may respectively indicate and be used to determine an SRS transmission port specified in a field capable of indicating a number of SRS transmission ports that is greater than a number of physical UE antenna ports.

26 Claims, 13 Drawing Sheets

(51) Int. Cl.
H04B 7/04 (2006.01)
H04B 7/06 (2006.01)
H04W 28/18 (2009.01)

(52) U.S. Cl.
CPC .......... *H04B7/0404* (2013.01); *H04B 7/0689* (2013.01); *H04L 5/0016* (2013.01); *H04L 27/2626* (2013.01); *H04W 28/18* (2013.01)

(56) References Cited

U.S. PATENT DOCUMENTS

| | | | | |
|---|---|---|---|---|
| 8,811,510 | B2* | 8/2014 | Zhuang | H04L 25/021 375/260 |
| 2009/0268854 | A1* | 10/2009 | Odoni et al. | 375/341 |
| 2010/0041350 | A1 | 2/2010 | Zhang et al. | |
| 2010/0173640 | A1 | 7/2010 | Pajukoski et al. | |
| 2010/0246561 | A1* | 9/2010 | Shin et al. | 370/345 |
| 2011/0081934 | A1* | 4/2011 | Imamura et al. | 455/522 |
| 2011/0096815 | A1* | 4/2011 | Shin et al. | 375/219 |
| 2011/0110357 | A1 | 5/2011 | Chung et al. | |
| 2011/0243007 | A1* | 10/2011 | Xiao | 370/252 |
| 2011/0243079 | A1* | 10/2011 | Chen et al. | 370/329 |
| 2011/0310818 | A1* | 12/2011 | Lin et al. | 370/329 |

FOREIGN PATENT DOCUMENTS

| WO | WO2009149561 A1 | 12/2009 |
|---|---|---|
| WO | WO2010016272 A1 | 2/2010 |

OTHER PUBLICATIONS

Ad-hoc Chairman (Samsung) : "Summary of the UL MIMO and UL RS Ad-hoc Session", Oct. 18, 2010 (Oct. 18, 2010), XP002677552, Retrieved from the Internet: URL:http://www.3gpp.org/ftp/tsg-ran/WGI-RLI/TSGRI62b/Docs/R1-105794.zip.

Ericsson, "Introduction of Rel-10 LTE-Advanced features in 36.211," 3GPP TSG-RAN Meeting #62, Madrid, Spain, Aug. 23-27, 2010, R1-105096, pp. 50.

International Search Report and Written Opinion—PCT/US2011/059832—ISA/EPO—Jun. 25, 2012.

ETSI TS 136 213 V10.0.1 (Jan. 2011), Evolved Universal Terrestrial Radio Access (E-UTRA); Physical layer procedures (3GPP TS 36.213 version 10.0.1 Release 10).

3GPP RAN1: "3rd Generation Partnership Project; Technical Specification Group Radio Access Network; Evolved Universal Terrestrial Radio Access (E-UTRA) ; Physical layer procedures(Release 8)" 3GPP TS 36.213 V8.3.0, [Online] vol. 36.213, No. V8.3.0, May 1, 2008 (May 1, 2008), pp. 1-45, XP002554705 Sophia Antipolis Retrieved from the Internet: URL:http://www.3gpp.org/ftp/Specs/archive/36-series/36.211/36213-830.zip> [retrieved on Nov. 9, 2009] p. 34, paragraph 8—p. 42, paragraph 9.1.2.

CATR., "Views on Transmission Modes and Control Signaling to Support UL MIMO," 3GPP TSG RAN WG1 Meeting #62bis, Xi'an, China, Oct. 11-15, 2010, 5 pages.

Ericsson, ST-Ericsson., "On Uplink Transmission Modes and Configuration," 3GPP TSG-RAN WG1#62bis, R1-105328, Xi'an, China, Oct. 11-15, 2010, 6 pages.

QUALCOMM Inc., "UL Transmission mode configuration," 3GPP TSG-RAN WG1 #63, R1-106364, Jacksonville, USA, Nov. 15-19, 2010, 7 pages.

Texas Instruments., "Transmission Modes and Signaling for UL MIMO," 3GPP TSG RAN WG1 61, Montreal, Canada, May 10-14, 2010, 5 pages.

Partial International Search Report—PCT/US2011/059832—ISA/EPO—Jan. 24, 2012.

Nokia Siemens Networks, Nokia, Remaining Details on R-PDCCH search space design[online], 3GPP TSG-RAN WG1#62b R1-105545, Oct. 2010, URL,http://www.3gpp.org/ftp/tsg_ran/WG1_RL1/TSGR1_62b/Docs/R1-105545.zip.

NTT DOCOMO, Views on Transmission Mode and Control Signaling to Support UL MIMO[online], 3GPP TSG-RAN WG1#62 R1-104936, Aug. 2010, URL, http://www.3gpp.org/ftp/tsg_ran/WG1_RL1/TSGR1_62/Docs/R1-104936.zip.

Huawei, "Uplink Transmission Modes and Antenna Ports Definition", 3GPP TSG-RAN WG1#62 R1-104295, URL: http://www.3gpp.org/ftp/tsg_ran/WG1_RL1/TSGR1_62/Docs/R1-104295.zip, Aug. 17, 2010, 5 Pages.

Sharp, "Open Issues in Antenna Port Mode Transitions", 3GPP TSG-RAN WG1#60 R1-101547, URL:http://www.3gpp.org/ftp/tsg.ran/WG1_RL1/TSGR1_60/Docs/R1-101547.zip, Feb. 19, 2010, 12 Pages.

Translation of First Office Action for Japanese Patent Application No. 2015-087469 dated Mar. 1, 2016, 3 pages.

* cited by examiner

METHOD AND APPARATUS FOR IMPROVING UPLINK TRANSMISSION MODE CONFIGURATION

CROSS-REFERENCE TO RELATED APPLICATION(S)

This application claims the benefit of U.S. Provisional Application Ser. No. 61/411,887, entitled "UPLINK TRANSMISSION MODE CONFIGURATION" and filed on Nov. 9, 2010, which is expressly incorporated by reference herein in its entirety.

BACKGROUND

Field

The present disclosure relates generally to communication systems, and more particularly, to a providing improved uplink transmission mode configuration and/or reconfiguration.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing uplink communication configurations. In one example, an evolved node B (eNB) may be equipped to transmit a first message to reconfigure an uplink transmission mode of a user equipment (UE) from a first uplink transmission mode to a second uplink transmission mode. Further, the UE may be equipped to implement a reconfiguration scheme to assure at least one of two or more second messages are recognizable by the UE during a transition period after transmission of the first message. In another example, a UE and eNB may be equipped to respectively transmit and receive a first message to reconfigure a SRS mode used by a UE. In such an aspect the first message may respectively indicate and be used to determine an SRS transmission port specified in a field capable of indicating a number of SRS transmission ports that is greater than a number of physical UE antenna ports.

According to related aspects, a method for providing uplink communication configurations is provided. The method can include transmitting a first message to reconfigure an uplink transmission mode of a UE from a first uplink transmission mode to a second uplink transmission mode. Moreover, the method can include implementing a reconfiguration scheme to assure at least one of two or more second messages are recognizable by the UE during the transition period after transmission of the first message.

Another aspect relates to a wireless communications apparatus. The wireless communications apparatus can include means for transmitting a first message to reconfigure an uplink transmission mode of a UE from a first uplink transmission mode to a second uplink transmission mode. Moreover, the wireless communications apparatus can include means for implementing a reconfiguration scheme to assure at least one of two or more second messages are recognizable by the UE during the transition period after transmission of the first message.

Another aspect relates to a wireless communications apparatus. The apparatus can include a processing system configured to transmit a first message to reconfigure an uplink transmission mode of a UE from a first uplink transmission mode to a second uplink transmission mode. Moreover, the processing system may further be configured to implement a reconfiguration scheme to assure at least one of two or more second messages are recognizable by the UE during the transition period after transmission of the first message.

Another aspect relates to a computer program product, which can have a computer-readable medium comprising code for transmitting a first message to reconfigure an uplink transmission mode of a UE from a first uplink transmission mode to a second uplink transmission mode. Moreover, the computer-readable medium can include code for implementing a reconfiguration scheme to assure at least one of two or more second messages are recognizable by the UE during the transition period after transmission of the first message.

According to related aspects, a method for providing sounding reference signal (SRS) transmission port is provided. The method can include transmitting a first message to reconfigure a SRS mode to a UE. Moreover, the method can include indicating, in the first message, an SRS transmission port specified in a field capable of indicating a number of SRS transmission ports that is greater than a number of physical UE antenna ports.

Another aspect relates to a wireless communications apparatus. The wireless communications apparatus can include means for transmitting a first message to reconfigure a SRS mode to a UE. Moreover, the wireless communications apparatus can include means for indicating, in the first message, an SRS transmission port specified in a field capable of indicating a number of SRS transmission ports that is greater than a number of physical UE antenna ports.

Another aspect relates to a wireless communications apparatus. The apparatus can include a processing system configured to transmit a first message to reconfigure a SRS mode to a UE. Moreover, the processing system may further be configured to indicate, in the first message, an SRS transmission port specified in a field capable of indicating a number of SRS transmission ports that is greater than a number of physical UE antenna ports.

Another aspect relates to a computer program product, which can have a computer-readable medium comprising code for transmitting a first message to reconfigure a SRS mode to a UE. Moreover, the computer-readable medium can include code for indicating, in the first message, an SRS transmission port specified in a field capable of indicating a number of SRS transmission ports that is greater than a number of physical UE antenna ports.

According to related aspects, a method for providing SRS transmission port configurations is provided. The method can include receiving a first message to reconfigure a SRS mode used by a UE. Moreover, the method can include determining, in response to reception of the first message, an SRS transmission port specified in a field capable of indicating a number of SRS transmission ports that is greater than a number of physical UE antenna ports.

Another aspect relates to a wireless communications apparatus. The wireless communications apparatus can include means for receiving a first message to reconfigure a SRS mode used by a UE. Moreover, the wireless communications apparatus can include means for determining, in response to reception of the first message, an SRS transmission port specified in a field capable of indicating a number of SRS transmission ports that is greater than a number of physical UE antenna ports.

Another aspect relates to a wireless communications apparatus. The apparatus can include a processing system configured to receive a first message to reconfigure a SRS mode used by a UE. Moreover, the processing system may further be configured to determine, in response to reception of the first message, an SRS transmission port specified in a field capable of indicating a number of SRS transmission ports that is greater than a number of physical UE antenna ports.

Another aspect relates to a computer program product, which can have a computer-readable medium comprising code for receiving a first message to reconfigure a SRS mode used by a UE. Moreover, the computer-readable medium can include code for determining, in response to reception of the first message, an SRS transmission port specified in a field capable of indicating a number of SRS transmission ports that is greater than a number of physical UE antenna ports.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

DETAILED DESCRIPTION

Figure 1:
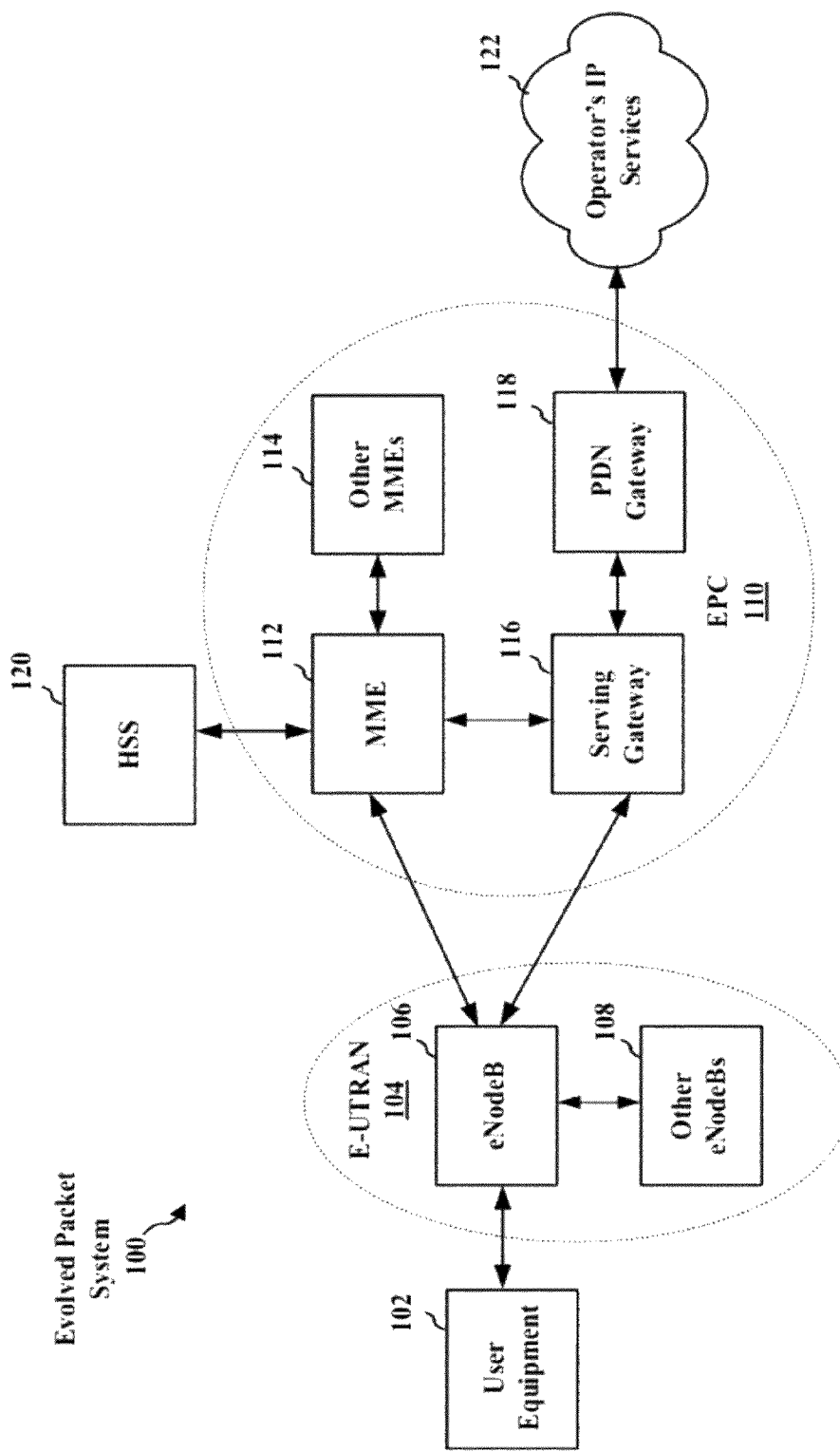
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control plane protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 may be connected by an S1 interface to the EPC 110. The EPC 110 includes a Mobility Management Entity (MME) 112, other MMEs 114, a Serving Gateway 116, and a Packet Data Network (PDN) Gateway 118. The MME 112 may be the control node that processes the signaling between the UE 102 and the EPC 110. Generally, the MME 112 provides bearer and connection management. All user IP packets may be transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
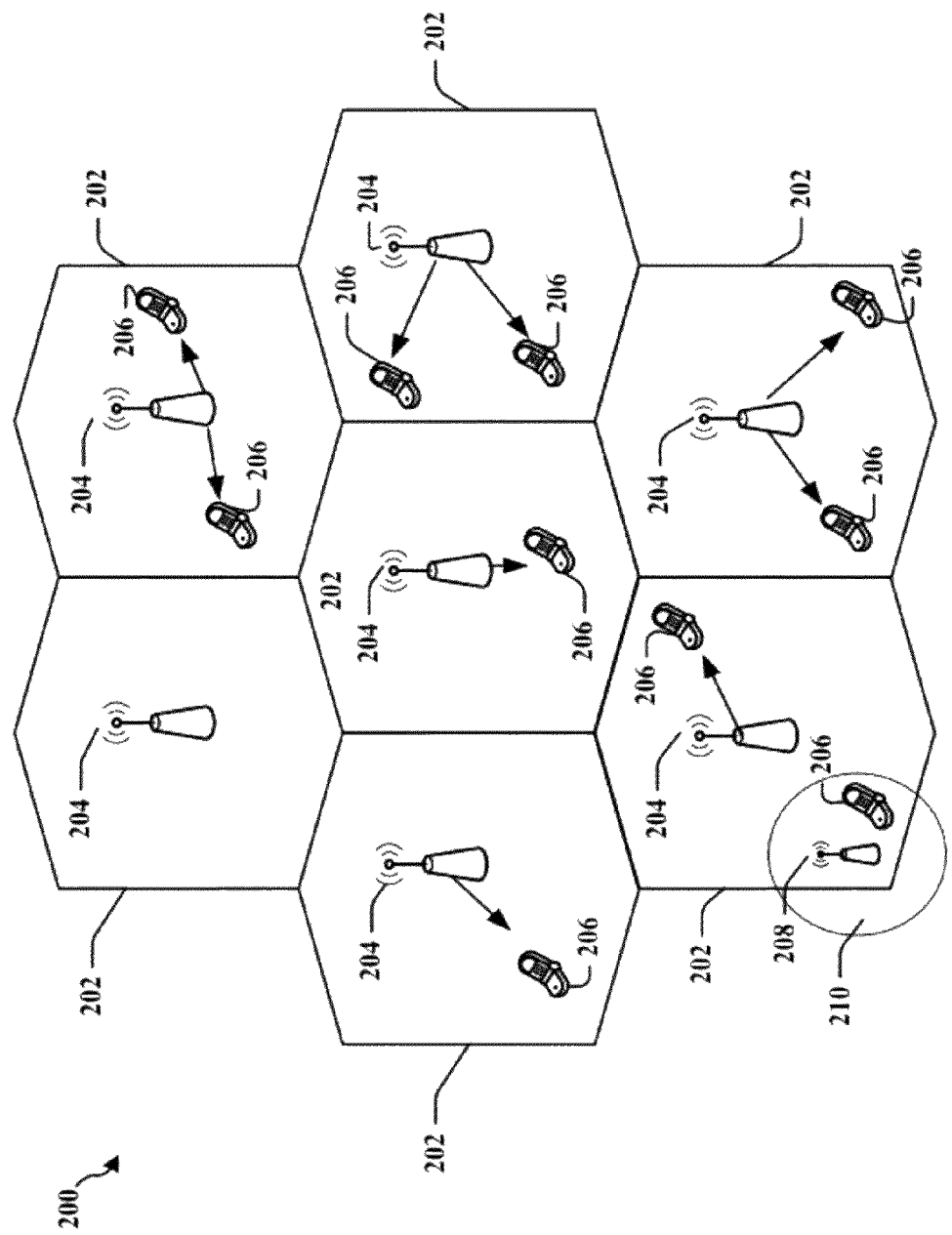
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
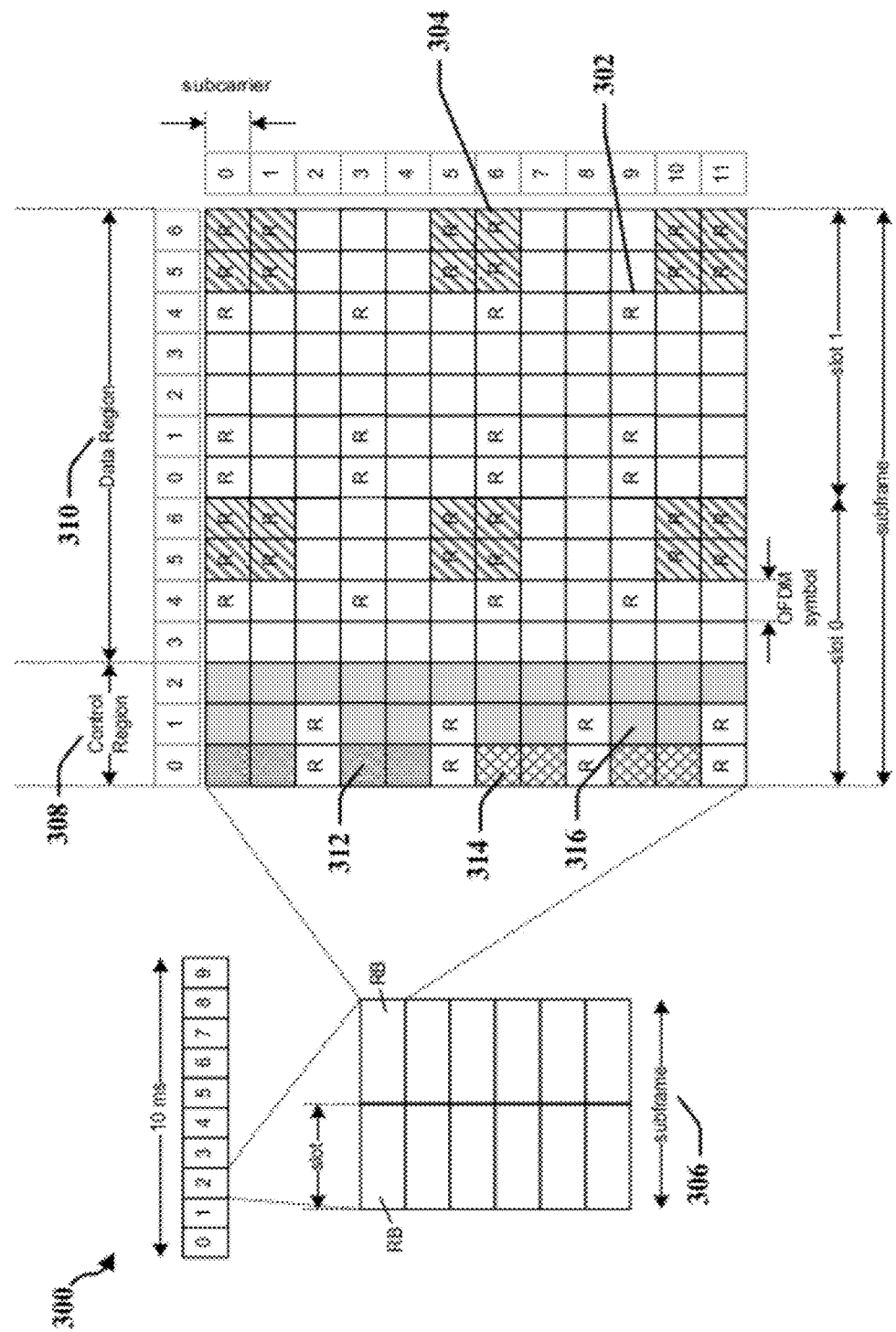
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames 306. Each sub-frame 306 may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Sub-frame 306 may be organized into a control region 308 and a data region 310. Control region 308 may include resources elements that may be allocated for various physical control channels. For example, control region 308 may include resource elements allocated to physical control format indictor channel (PCFICH) 312, physical hybrid ARQ indicator channel (PHICH) 314, and physical downlink control channel (PDCCH) 316.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH 312 may occupy four REGs, which may be spaced approximately equally across frequency, in symbol period 0. The PHICH 314 may occupy three REGs, which may be spread across frequency, in one or more configurable symbol periods. For example, the three REGs for the PHICH 314 may all belong in symbol period 0 or may be spread in symbol periods 0, 1 and 2. The PDCCH 316 may occupy 9, 18, 32 or 64 REGs, which may be selected from the available REGs, in the first M symbol periods. Only certain combinations of REGs may be allowed for the PDCCH 316.

A UE may know the specific REGs used for the PHICH 314 and the PCFICH 312. The UE may search different combinations of REGs for the PDCCH 316. The number of combinations to search is typically less than the number of allowed combinations for the PDCCH 316. An eNB may send the PDCCH 316 to the UE in any of the combinations that the UE may search.

Figure 4:
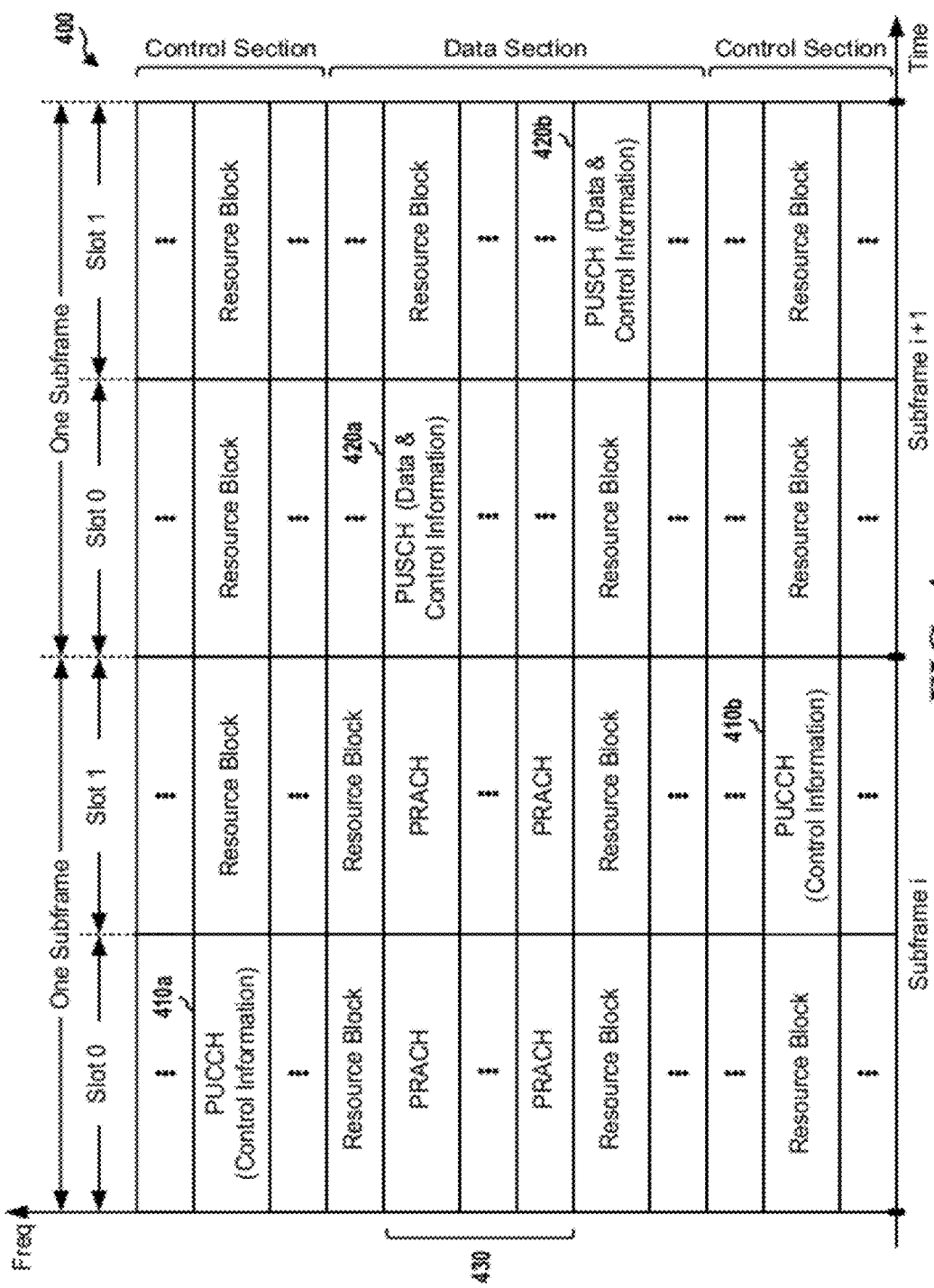
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
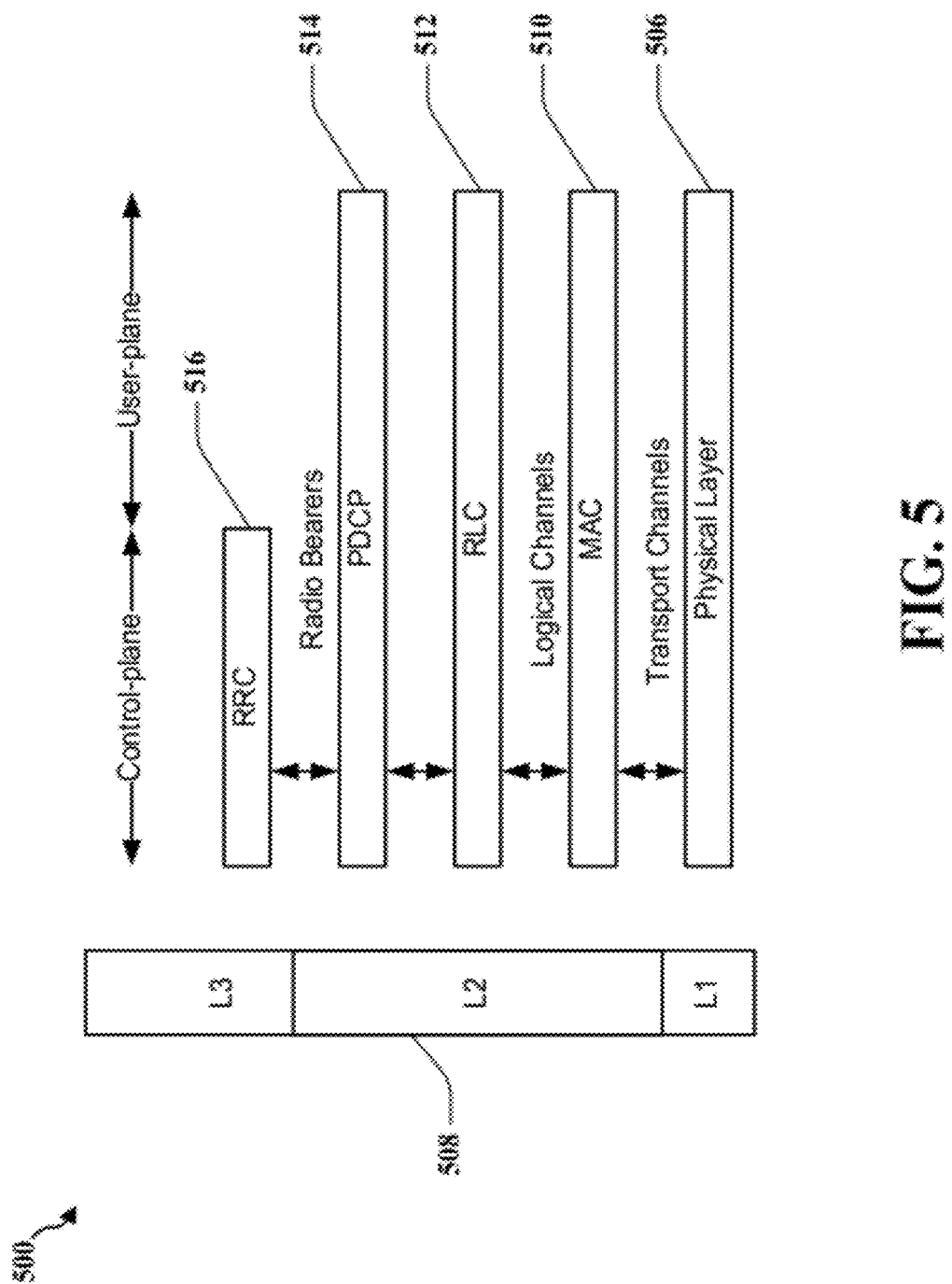
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
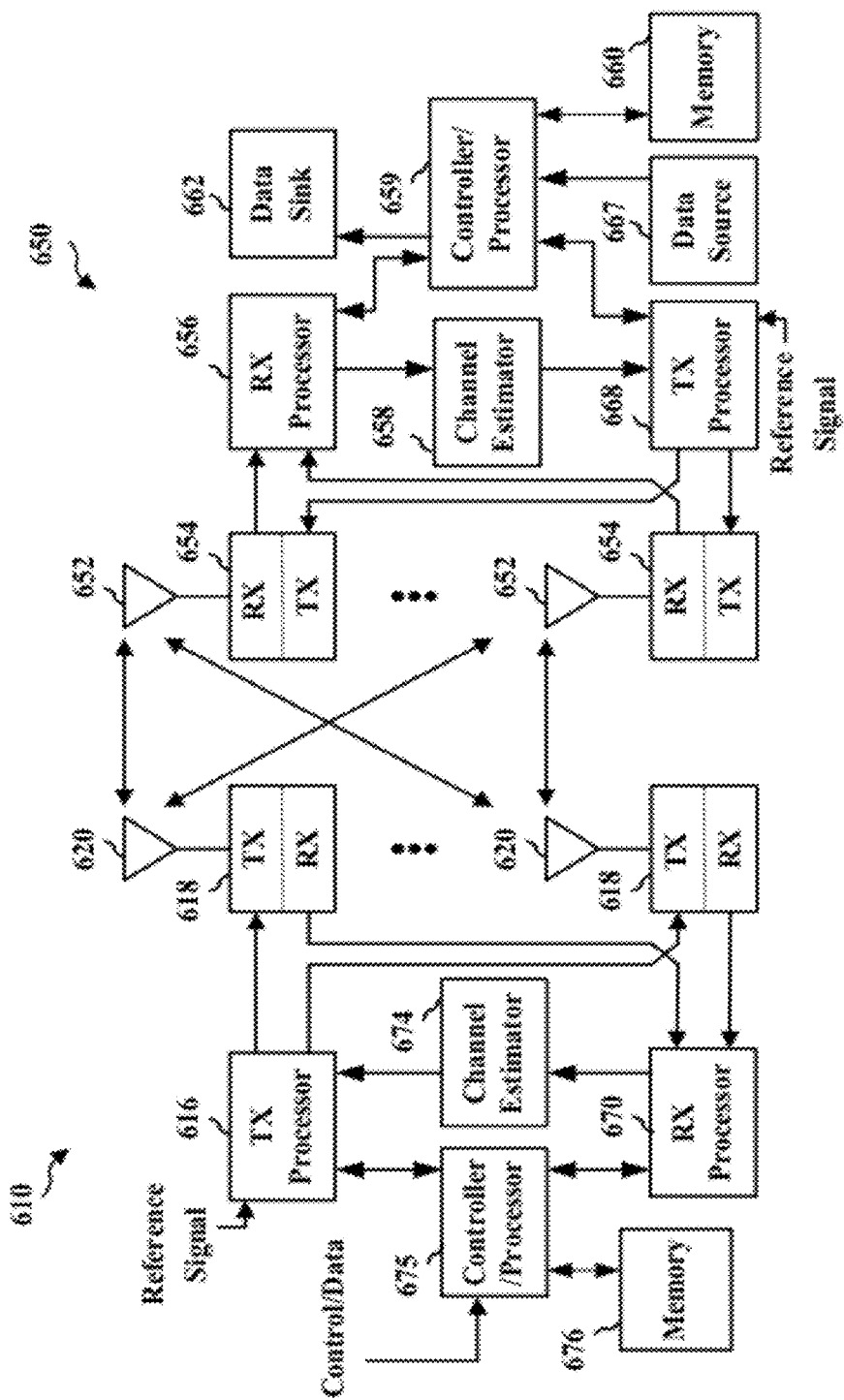
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Generally, a UE may be operable to communicate using various uplink transmission modes. In one aspect, regarding the LTE-A UL transmission modes, two PUSCH transmission modes may be used. As used herein, PUSCH Mode 1 may be a single antenna port mode. Further, in such an aspect, various different configurations may exist. One configuration may enable a Rel-8 PUSCH transmission scheme. Generally, when a UE accesses a cell, it may use the Rel-8 compatible UL transmission mode and configuration. Other configuration may support: both contiguous and non-contiguous random access (RA) that may be dynamically configured through PDCCH, Rel-10 orthogonal cover code/cyclic shift (OCC/CS) mapping table, and dynamic aperiodic SRS triggering. In one aspect, the configuration may be operable for de-configuring/configuring Rel-10 OCC/CS mapping table.

Further, as used herein, PUSCH Mode 2 may be a multiple antenna port mode. Various different configurations may exist in this mode (e.g., where reference DCI format 4 is used). In one aspect, one configuration may be operable where antenna ports {0,1} are configured for PUSCH (e.g. PUSCH is using a 2TX codebook). In another aspect, a different configuration may be operable where antenna ports {0,1,2,3} are configured for PUSCH (e.g. PUSCH is using a 4TX codebook). As discussed in greater detail below, control information associated with the uplink transmission modes may be transmitted in various search spaces, e.g., UE-specific or cell-specific, etc. In one aspect, where a fallback DCI format 0 is received by the UE, a single antenna port may be used.

With respect to PUSCH Mode 1 and Mode 2, as used herein, a UL transmission scheme 1 may include the Rel-8 compatible UL configuration in PUSCH Mode 1 discussed above. UL transmission scheme 2 may include the non-Rel-8 compatible UL configuration in PUSCH Mode 1. Generally, UL transmission scheme 2 may refers collectively to many different possible configuration combinations. UL transmission scheme 3 may include UE operation in PUSCH Mode 2. For reference, attributes of these transmission schemes are described below.

Rel-8 Configuration (Transmission Scheme 1)

The UE may use transmission scheme 1 if any of the following is true: the UE has not received an UL transmission mode configuration; the UE has received UL transmission mode 1 configuration and all the following are true: the UE is configured to use only sounding reference signal (SRS) port 10, the UE is not configured to use aperiodic SRS, the UE is not configured to use Spatial Orthogonal-Resource Transmit Diversity (SORTD) for any of the PUCCH formats, and the UE is not configured to use simultaneous PUCCH and PUSCH transmission on the same component carrier.

In transmission scheme 1, the following configurations may be true: the UE monitors only DCI format 0 for UL grants; the UE may be configured to use either open loop or closed loop antenna switching as per Rel-8; the PUSCH and SRS transmission ports are substantially identical; the UE may use a different antenna port for PUCCH and PUSCH; and the UE may use precoding vector switching for the PUCCH.

Rel-10 Configuration (Transmission Scheme 2)

The UE may use transmission scheme 2 if the following is true: the UE has received UL transmission mode 1 configuration and any of the following is true: the UE is configured to use an SRS transmission port other than port 10; the UE is configured to use aperiodic SRS; the UE is configured to use SORTD for any of the PUCCH formats; the UE is configured to use simultaneous PUCCH and PUSCH transmission on the same component carrier.

In transmission scheme 2, the following configurations may be true: the UE monitors DCI format 0 and (0A, 0B, . . . ) for UL grants; the UE uses transmission port 0 for the PUSCH; the UE may not be configured to use either open loop or closed loop Rel-8 antenna switching; and the UE may use a different antenna port for PUCCH and PUSCH, e.g. transmission port 0 and transmission ports 20 and 21 have no relationship. In one aspect, the UE may use precoding vector switching for the PUCCH.

Multi-Antenna Configuration (Transmission Scheme 3)

The UE may use transmission scheme 3 when the UE has received a UL transmission mode 2 configuration.

In transmission scheme 3, the following configurations may be true: the UE monitors both DCI format 0 and 4 for UL grants; the UE may not be configured to use either open loop or closed loop Rel-8 antenna switching; the UE may use a different antenna port for PUCCH and PUSCH, e.g. transmission port 0 and transmission ports 20 and 21 have no relationship; the UE may use precoding vector switching for the PUCCH.

In operation, where there is configuration change relevant to the transmission modes, there is a possibility that during a transitional period, the configuration assumption in the eNB and UE falls out of sync. Some UL configuration changes may change the size of DCI format 0 (or format 0A, 0B, etc.) which is size matched to the DL format 1A, which may cause loss of the DL control as well. To address the above described issues, methods and apparatuses are discussed with reference to FIGS. 7, 8, 10, and 11.

Figure 7:
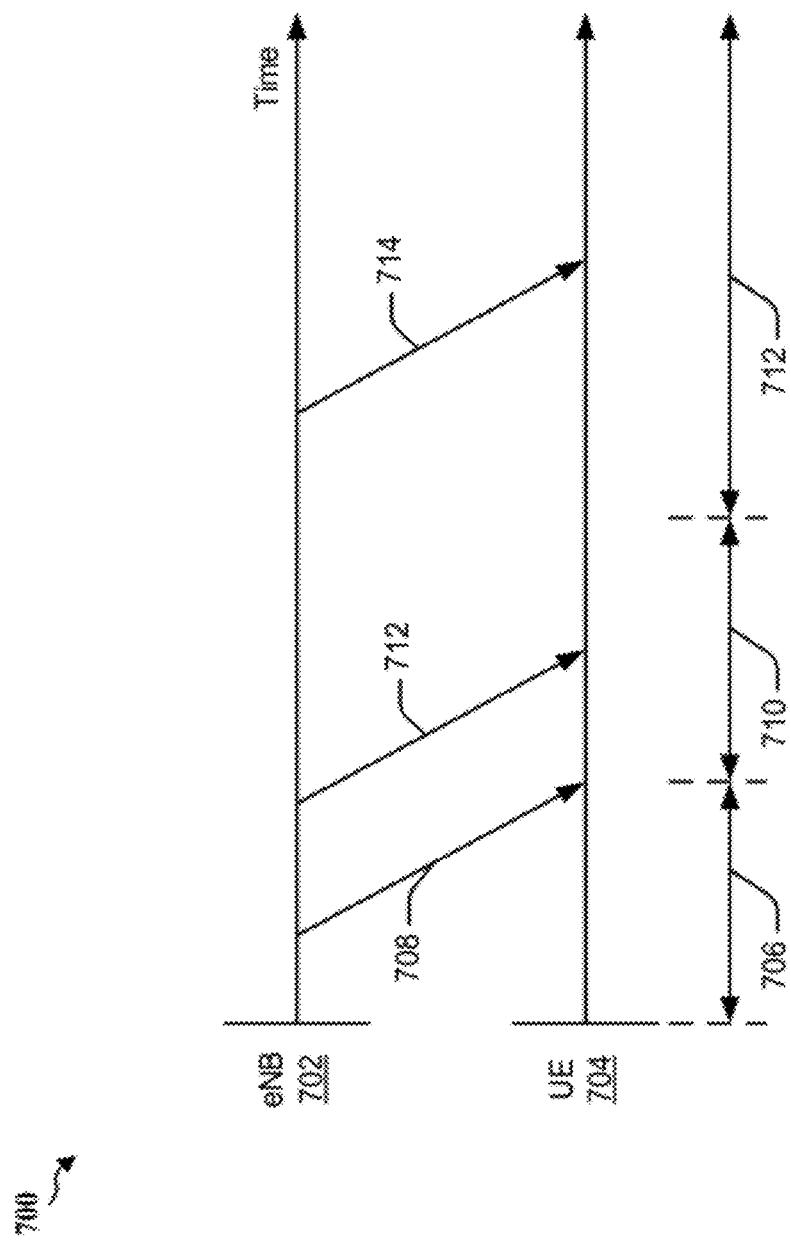
FIG. 7 is a diagram illustrating an evolved NodeB and user equipment performing uplink transmission mode reconfiguration.

FIG. 7 is a diagram illustrating an eNB and UE performing uplink transmission mode reconfiguration in an access network 700. As depicted in FIG. 7, activities associated with eNB 702 and UE 704 are described against a time axis. In operation, UE 704 may be operable using a first uplink transmission mode during time interval 706. eNB 702 may determine UE 704 should use a different uplink transmission mode than is being used during time interval 706 and may transmit a message 708 prompting UE 704 to reconfigure uplink transmissions to a different uplink transmission mode. In one aspect, the first uplink transmission mode may be accessible to a LTE Rel-8 operable UE 704, and the second uplink transmission mode may be accessible to a LTE Rel-10 operable UE 704. In one aspect, the first uplink transmission mode is a single antenna port mode compatible with a LTE Rel-8 UE. In another aspect, the second uplink transmission mode is a single antenna port mode not compatible with a LTE Rel-8 UE. Additionally or in the alternative, the second uplink transmission mode is a multiple antenna port mode. In one aspect, the second uplink transmission mode is configured to support dynamic aperiodic sounding reference signal (SRS) triggering.

After transmission of message 708, eNB may not detect if/when UE 704 has successfully transitioned to operations under the different uplink transmission mode. During this ambiguous time duration 710, eNB 702 may implement a reconfiguration scheme to assure at least one of two or more second messages are recognizable by the UE during the transition period (ambiguous period 710) after transmission of the first message 708. In one aspect, message 712 may include two or more second messages, where a first message of the two or more second messages is recognizable by UE 704 before the reconfiguration and a second message of the two or more second messages is recognizable by the UE 704 after the reconfiguration. In another aspect, message 712 may communicate control information in a UE specific search space for one uplink transmission mode and control information in a common search space for another uplink transmission mode. In such an aspect, the control information associated with the uplink transmission mode used during time interval 706 may be transmitted in the UE specific space, and the control information associated with the new uplink transmission mode may be transmitted in the common search space. In one aspect, the control information may be transmitted in the UE specific search space and common search space of a PDCCH. In one aspect, eNB may attempt to avoid configuration issues during ambiguous time interval 710 by defining an uplink reconfiguration period and a downlink reconfiguration period, where the uplink reconfiguration period and the downlink reconfiguration period are defined at different times. In such an aspect, during the uplink reconfiguration period, a DCI format size in a UE-specific search space is changed as part of the reconfiguration, eNB 702 may use a different DCI format for a DL grant. In one aspect, the different DCI format used for DL grant may be a format different than one used for DL fallback operations.

Upon successful reconfiguration to a new uplink transmission mode by UE 704, during time interval 712, eNB may transmit one or more messages 714 including control information associated with the new uplink transmission mode. In one aspect, the control information may be included in a UE specific search space of the PDCCH.

Figure 8:
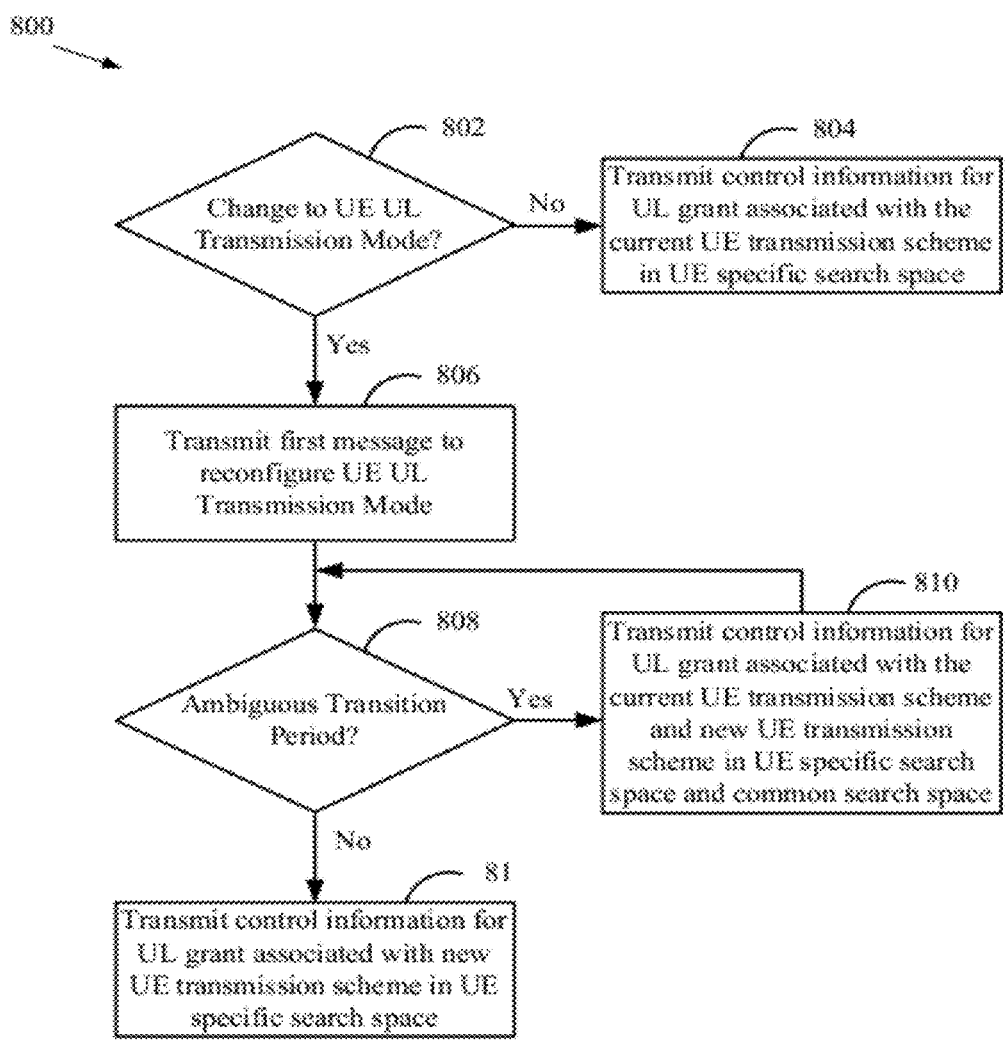
FIG. 8 is a flow chart of a method of wireless communication.

FIG. 8 is a flowchart 800 of a method of wireless communication. The method may be performed by an eNB. In one aspect, the eNB may determine if a UE is attempting to access a cell and whether the UE is using a particular UL transmission mode (e.g., UL transmission scheme 1). In one aspect, UL transmission scheme 1 may be configured to be a default setting for a UE attempting to access a cell. If the UE is not attempting to access the cell and/or in the optional aspect, if the eNB determines that the UE is using a UL transmission scheme operable to access the cell, then at block 802 the eNB may determine if the UE UL transmission scheme should change. If at block 802, the eNB determines the UL transmission scheme should not change, then at block 804 the eNB may transmit control information (e.g., UL grant information) to the UE associated with the current UL transmission scheme. By contrast, if at block 802 the eNB determines a change in UL transmission schemes should be implemented, then at block 806, the eNB transmits a first message to the UE to reconfigure the UE UL transmission scheme to a new UL transmission scheme (e.g., UL transmission schemes 2 or 3).

During an ambiguous transition period, as discussed in FIG. 7, the eNB may not be aware if and/or when the UE has implemented the new UL transmission scheme. At block 808, the eNB determines if communications are occurring within this ambiguous transition period. In one aspect, the ambiguous transition period may continue until the UE confirms successful transition to the new UL transmission scheme. In another aspect, the ambiguous transition period may continue for a duration defined by the eNB. If at block 808, the eNB determines the ambiguous transition period is still active, then at block 810, the eNB may transmit control information associated with both the original UL transmission scheme and the new UL transmission scheme. In one aspect, the message may communicate control information in a UE specific search space for one uplink transmission mode/scheme and control information in a common search space for another uplink transmission mode/scheme. In such an aspect, the control information associated with the uplink transmission mode/scheme used prior to the ambiguous transition period may be transmitted in the UE specific space, and the control information associated with the new uplink transmission mode/scheme may be transmitted in the common search space. In one aspect, the control information may be transmitted in the UE specific search space and common search space of a PDCCH.

After the eNB determines the ambiguous transition period is complete, or no longer active, at block 808, then at block 812, the eNB may transmit control information associated with the new UL transmission scheme. In one aspect, the control information may be included in the UE-specific space of the PDCCH.

Figure 9A:
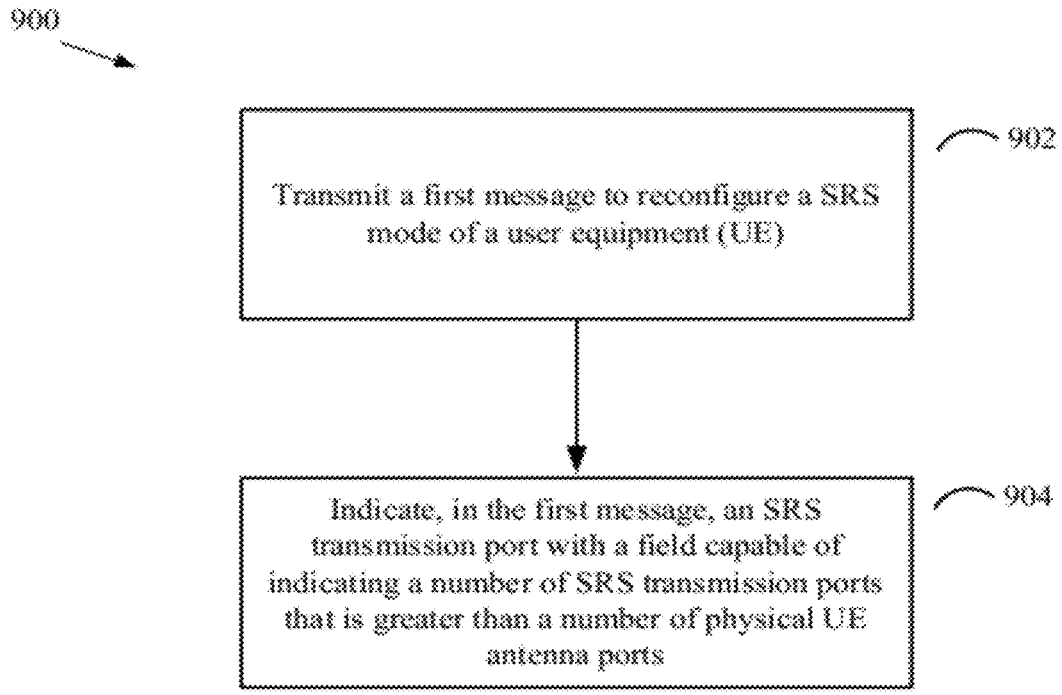
FIG. 9A is a flow chart of another method of wireless communication.

FIG. 9A is a flowchart 900 of another method of wireless communication. The method may be performed by an eNB. At block 902, the eNB may transmit a first message to reconfigure a sounding reference signal (SRS) mode of user equipment (UE). At 904, the eNB may indicate, in the first message, an SRS transmission port specified in a field capable of indicating a number of SRS transmission ports that is greater than a number of physical UE antenna ports.

Figure 9B:
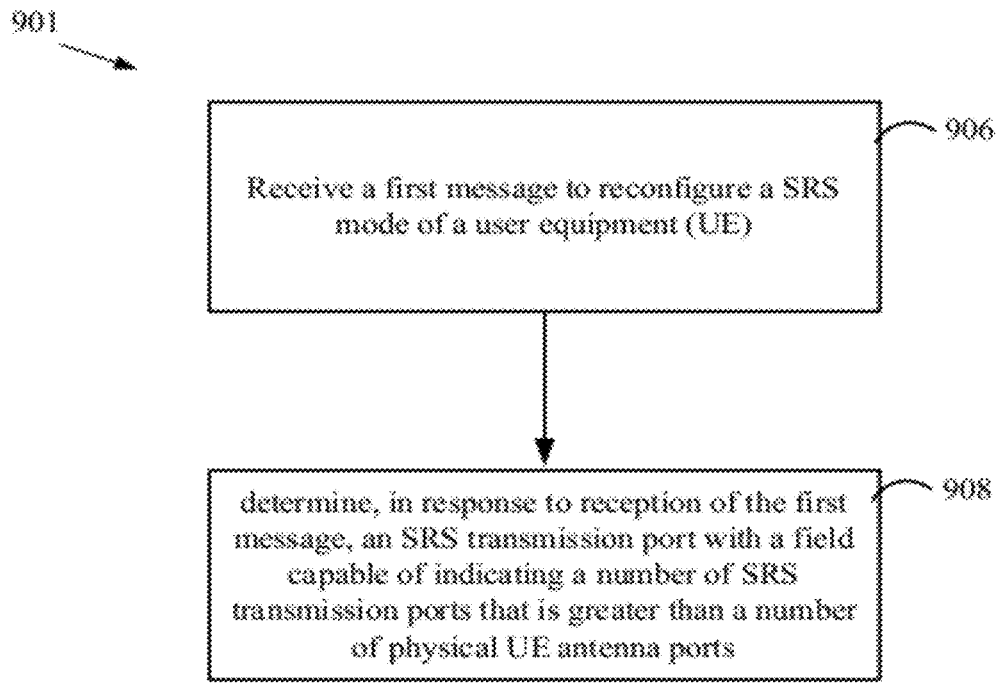
FIG. 9B is a flow chart of still another method of wireless communication.

FIG. 9B is a flowchart 901 of still another method of wireless communication. The method may be performed by a UE. At block 906, a UE may receive, from an eNB, a first message to reconfigure a sounding reference signal (SRS) mode. At 908, the UE may determine an SRS transmission port specified in a field capable of indicating a number of SRS transmission ports that is greater than a number of physical UE antenna ports.

With respect to FIGS. 9A and 9B, according to one aspect, the following SRS transmission ports may be defined in Table 1.

TABLE 1

SRS Transmission Port definitions

| SRS Port Number | Description of SRS Value |
|---|---|
| SRS transmission port 10 | same antenna or antenna virtualization as PUSCH Mode 1 single antenna transmission scheme 1 or 2 using PUSCH transmission port 0 |
| SRS transmission port 11 | same antenna or antenna virtualization as PUSCH Mode 2 multi-antenna transmission configured with 2Tx antenna transmission scheme using PUSCH transmission port 0 |
| SRS transmission port 12 | same antenna or antenna virtualization as PUSCH Mode 2 multi-antenna transmission configured with 2Tx antenna transmission scheme using PUSCH transmission port 1 |
| SRS transmission port 13 | same antenna or antenna virtualization as PUSCH Mode 2 multi-antenna transmission configured with 4Tx antenna transmission scheme using PUSCH transmission port 0 |
| SRS transmission port 14 | same antenna or antenna virtualization as PUSCH Mode 2 multi-antenna transmission configured with 4Tx antenna transmission scheme using PUSCH transmission port 1 |
| SRS transmission port 15 | same antenna or antenna virtualization as PUSCH Mode 2 multi-antenna transmission configured with 4Tx antenna transmission scheme using PUSCH transmission port 2 |
| SRS transmission port 16 | same antenna or antenna virtualization as PUSCH Mode 2 multi-antenna transmission configured with 4Tx antenna transmission scheme using PUSCH transmission port 3 |

Figure 10:
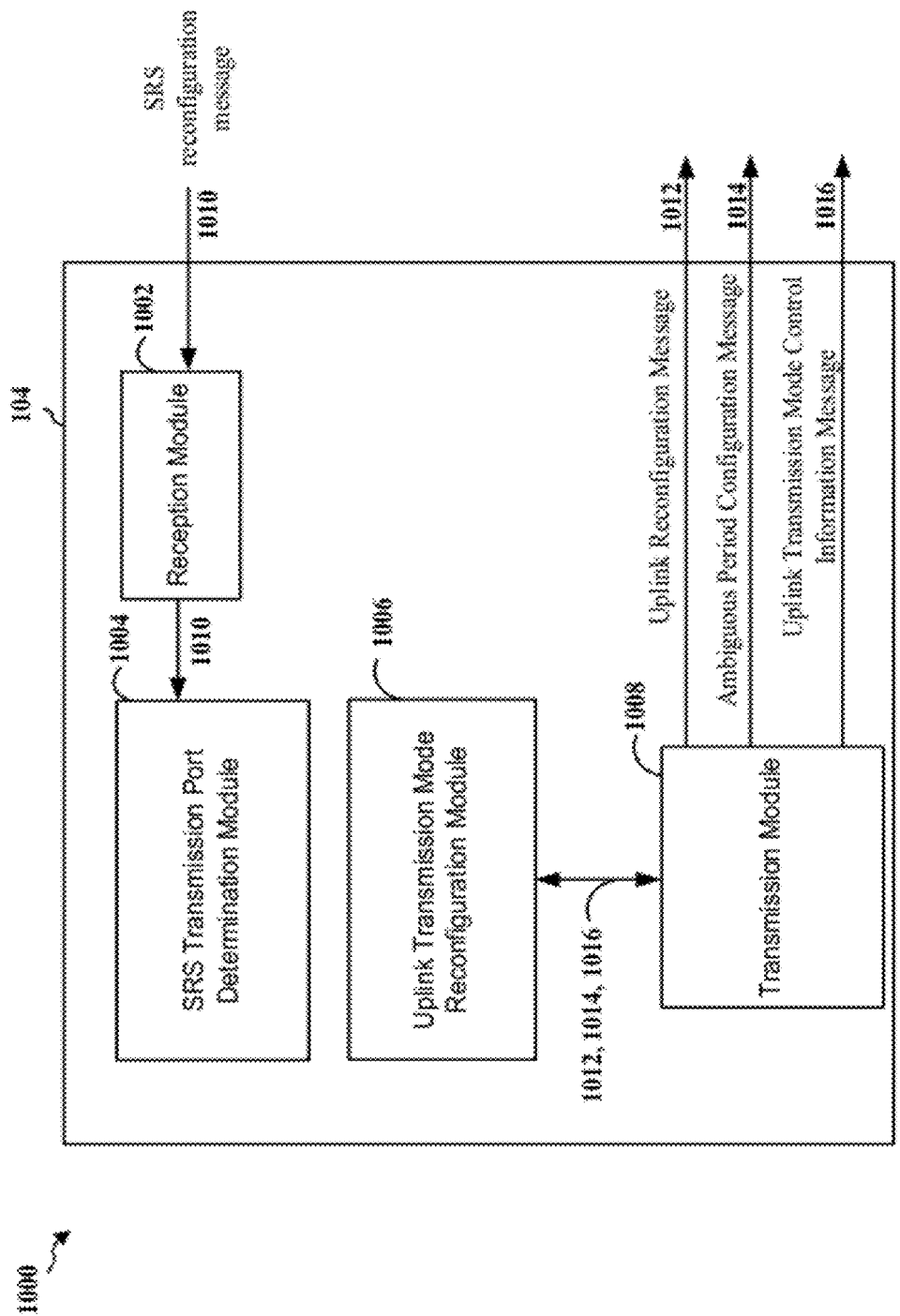
FIG. 10 is a conceptual data flow diagram illustrating the data flow between different modules/means/components in an exemplary apparatus.

FIG. 10 is a conceptual data flow diagram 1000 illustrating the data flow between different modules/means/components in an exemplary apparatus 104. The apparatus 104 includes a module 1002 that receives an SRS reconfiguration message 1010, and a module 1004 that determines an SRS transmission port for use from a field capable of indicating a number of SRS transmission ports that is greater than a number of physical UE antenna ports. The apparatus 104 may further include a module 1006 that determines whether to reconfigure an uplink transmission mode for a UE, and a module 1008 that transmits one or more messages 1012, 1014, 1016 generated by module 1004. In one aspect, module 1006 may generate and module 1008 may transmit a message, e.g., an uplink reconfiguration message 1012, indicating an uplink transmission mode reconfiguration process. During a transition time, where the eNB is unable to determine whether the UE has implemented the uplink transmission mode reconfiguration mode, an ambiguous period configuration message 1014 may be transmitted. Ambiguous period configuration message 1014 that may include instances of control information (e.g., uplink grants, etc.), where one instance may be configured to be recognizable prior to the reconfiguration, and a second instance may be configured to be recognizable after the reconfiguration is processed by the UE. After success reconfiguration, module 1006 may generate and module 1008 may transmit uplink transmission module control information message 1016 using the uplink transmission mode that is operable after the reconfiguration.

The apparatus may include additional modules that perform each of the steps of the algorithm in the aforementioned flow charts FIGS. 8 and 9A. As such, each step in the aforementioned flow charts FIGS. 8 and 9A may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 11:
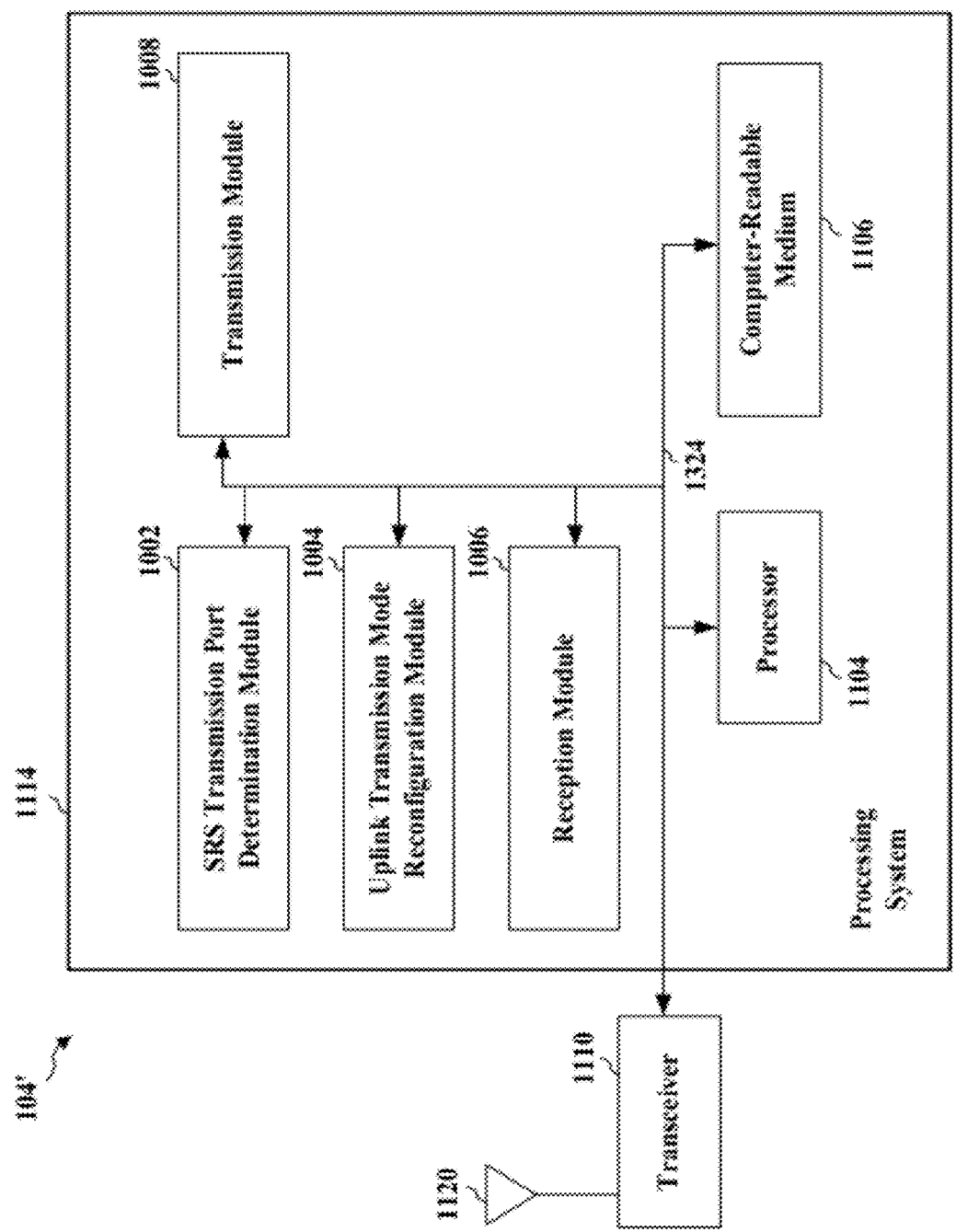
FIG. 11 is a diagram illustrating an example of a hardware implementation for an apparatus employing a processing system.

FIG. 11 is a diagram illustrating an example of a hardware implementation for an apparatus 104' employing a processing system 1114. The processing system 1114 may be implemented with a bus architecture, represented generally by the bus 1124. The bus 1124 may include any number of interconnecting buses and bridges depending on the specific application of the processing system 1114 and the overall design constraints. The bus 1124 links together various circuits including one or more processors and/or hardware modules, represented by the processor 1104, the modules 1002, 1004, 1006, 1008, and the computer-readable medium 1106. The bus 1124 may also link various other circuits such as timing sources, peripherals, voltage regulators, and power management circuits, which are well known in the art, and therefore, will not be described any further.

Processing system 1114 may be coupled to a transceiver 1110. The transceiver 1110 is coupled to one or more antennas 1120. The transceiver 1110 provides a means for communicating with various other apparatus over a transmission medium. The processing system 1114 includes a processor 1104 coupled to a computer-readable medium 1106. The processor 1104 is responsible for general processing, including the execution of software stored on the computer-readable medium 1106. The software, when executed by the processor 1104, causes the processing system 1114 to perform the various functions described supra for any particular apparatus. The computer-readable medium 1106 may also be used for storing data that is manipulated by the processor 1104 when executing software. The processing system further includes modules 1002, 1004, 1006, and 1008. The modules may be software modules running in the processor 1104, resident/stored in the computer readable medium 1106, one or more hardware modules coupled to the processor 1104, or some combination thereof. The processing system 1114 may be a component of the eNB 610 and may include the memory 676 and/or at least one of the TX processor 616, the RX processor 670, and the controller/processor 675.

In one configuration, the apparatus 104/104' for wireless communication includes means for transmitting a first message to reconfigure an uplink transmission mode of a UE from a first uplink transmission mode to a second uplink transmission mode, and means for implementing a reconfiguration scheme to assure at least one of two or more second messages are recognizable by the UE during the transition period after transmission of the first message. In one aspect, apparatus 104/104' may include means for transmitting the two or more second messages, wherein one of the two or more second messages is recognizable by the UE before the reconfiguration and another message of the two or more second messages is recognizable by the UE after the reconfiguration. In such an aspect, the means for transmitting may include means for transmitting the first message in a UE-specific search space, and means for transmitting the second message in a common search space. In one aspect, the means for implementing may further include means for defining an uplink reconfiguration period and a downlink reconfiguration period, where the uplink reconfiguration period and the downlink reconfiguration period are defined at different times. In such an aspect, the means for implementing may further include means for using a different DCI format for a DL grant during the uplink reconfiguration period, when a DCI format size in a UE-specific search space is changed as part of the reconfiguration. In one configuration, apparatus 104/104' may includes means for receiving a first message to reconfigure a SRS mode used by a UE, and means for determining, in response to reception of the first message, an SRS transmission port specified in a field capable of indicating a number of SRS transmission ports that is greater than a number of physical UE antenna ports. The aforementioned means may be one or more of the aforementioned modules of the apparatus 104 and/or the processing system 1114 of the apparatus 104' configured to perform the functions recited by the aforementioned means. As described supra, the processing system 1114 may include the TX Processor 616, the RX Processor 670, and the controller/processor 675. As such, in one configuration, the aforementioned means may be the TX Processor 616, the RX Processor 670, and the controller/processor 675 configured to perform the functions recited by the aforementioned means.

Figure 12:
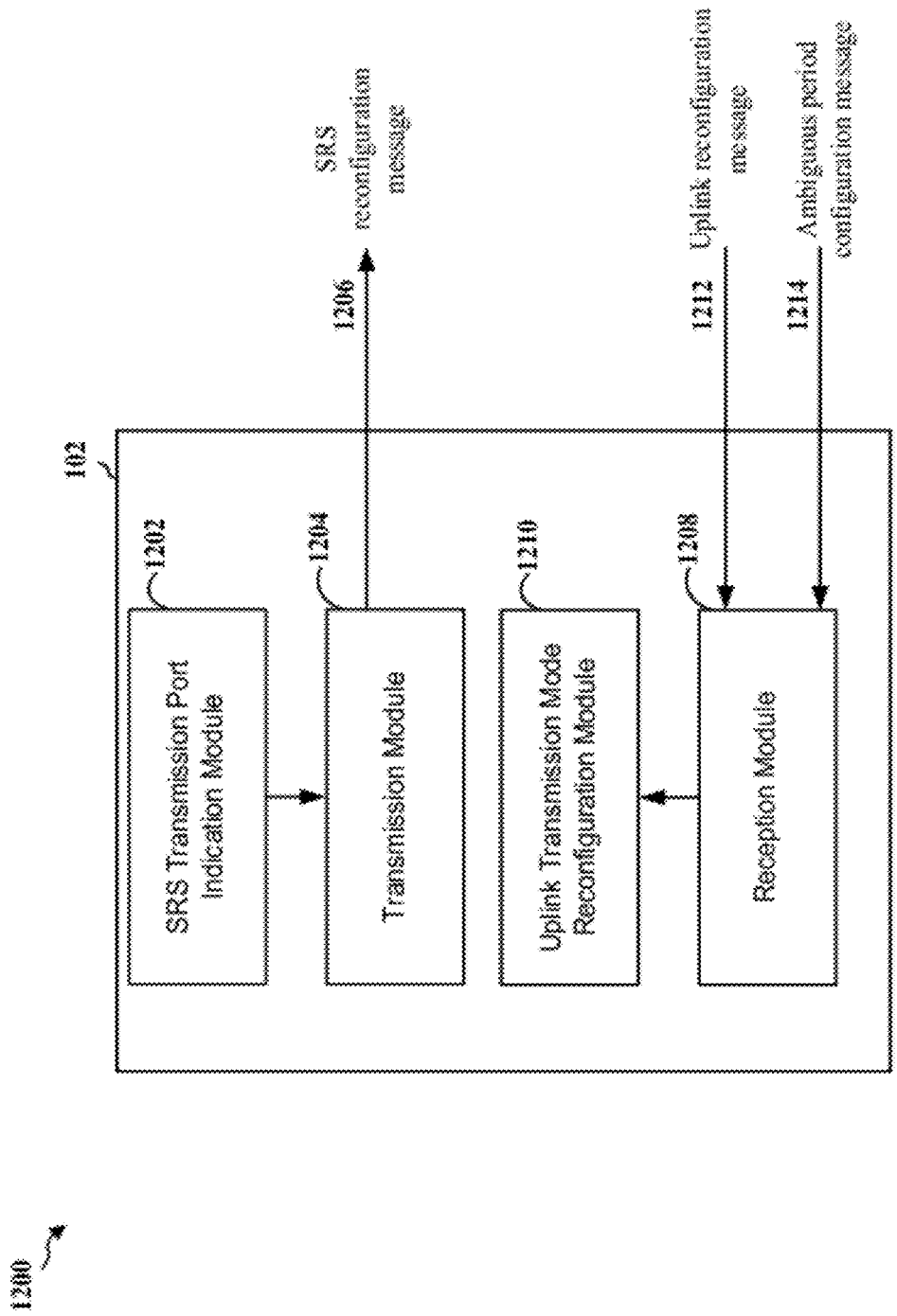
FIG. 12 is a conceptual data flow diagram illustrating the data flow between different modules/means/components in another exemplary apparatus.

FIG. 12 is a conceptual data flow diagram 1200 illustrating the data flow between different modules/means/components in an exemplary apparatus 102. The apparatus 102 includes a module 1202 that indicates SRS values for various transmission ports and port combinations as part of an SRS reconfiguration process, and generates a SRS reconfiguration message 1206 for communication by transmission module 1204. Transmission module 1204 transmits the SRS reconfiguration message 1206 that may include a field capable of indicating a number of SRS transmission ports that is greater than a number of physical UE antenna ports.

In another aspect, apparatus 102 may include a module 1208 can receive an uplink reconfiguration message 1212, and a module 1210 that may reconfigure an uplink transmission mode for the UE 102. In one aspect, during an ambiguous period after a eNB has initiated uplink transmission mode reconfiguration, module 1208 can receive an ambiguous period configuration message 1214 that may include instances of control information, where one instance may be configured to be recognizable prior to the reconfiguration, and a second instance may be configured to be recognizable after the reconfiguration is processed by module 1210. In one aspect, upon successful completion of the uplink reconfiguration process, module 1210 may generate a reconfiguration confirmation message 1216 that may be transmitted by transmission module 1204.

The apparatus may include additional modules that perform each of the steps of the algorithm in the aforementioned flow chart FIG. 9B. As such, each step in the aforementioned flow chart FIG. 9B may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
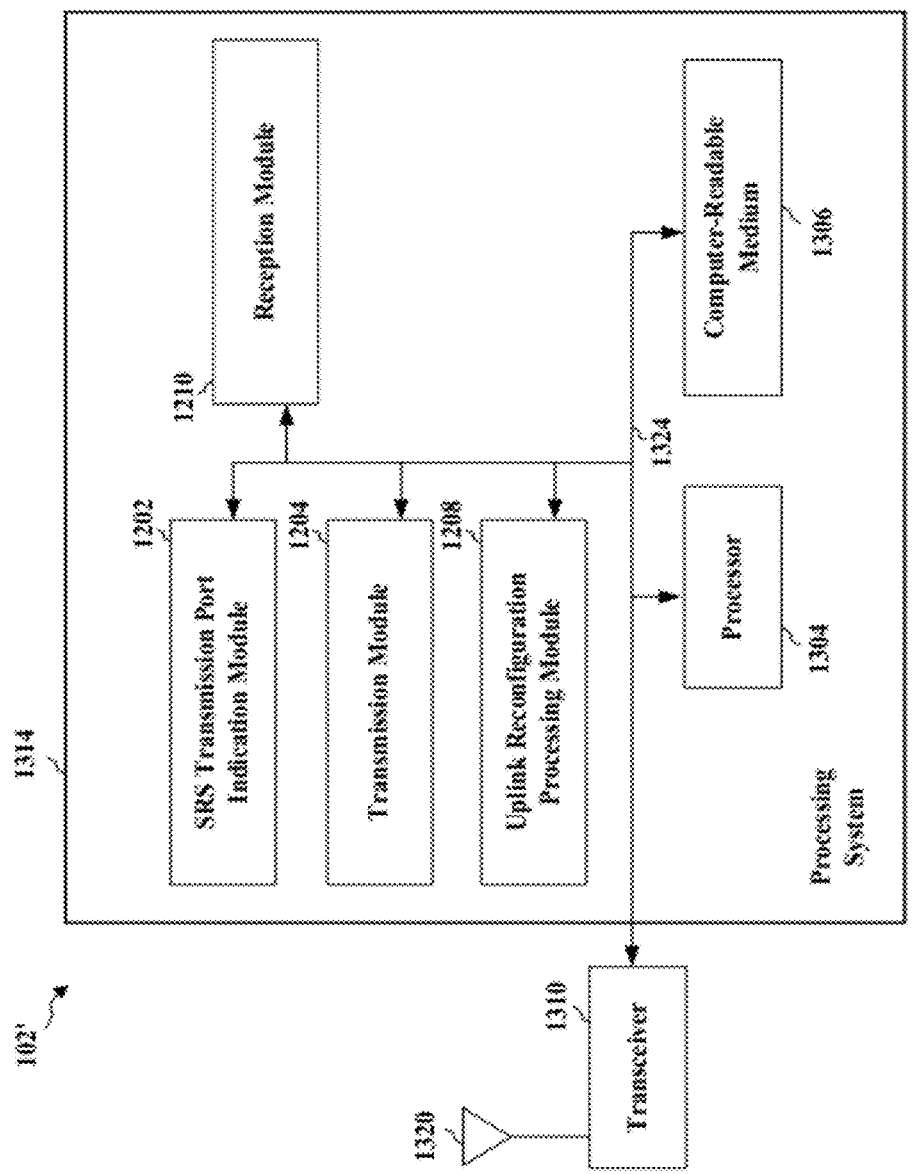
FIG. 13 is a diagram illustrating an example of a hardware implementation for another apparatus employing a processing system.

FIG. 13 is a diagram illustrating an example of a hardware implementation for an apparatus 102' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1202, 1204, 1208, 1210, and the computer-readable medium 1306. The bus 1324 may also link various other circuits such as timing sources, peripherals, voltage regulators, and power management circuits, which are well known in the art, and therefore, will not be described any further.

Processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes modules 1202, 1204, 1208, and 1210. The modules may be software modules running in the processor 1304, resident/stored in the computer readable medium 1306, one or more hardware modules coupled to the processor 1304, or some combination thereof. The processing system 1314 may be a component of the UE 650 and may include the memory 660 and/or at least one of the TX processor 668, the RX processor 656, and the controller/processor 659.

In one configuration, the apparatus 102/102' for wireless communication includes means for transmitting a first message to reconfigure a sounding reference signal (SRS) mode of a UE, and means for indicating, in the first message, an SRS transmission port specified in a field capable of indicating a number of SRS transmission ports that is greater than a number of physical UE antenna ports. In one aspect, when there are four physical UE antenna ports, the number of SRS transmission ports indicated is equal to six. In another aspect, when there are two physical UE antenna ports, the number of SRS transmission ports indicated is equal to three. In still another aspect, the SRS mode is associated with either a first uplink transmission mode that uses a single antenna port or a second uplink transmission mode that uses multiple antennas ports. The aforementioned means may be one or more of the aforementioned modules of the apparatus 102 and/or the processing system 1314 of the apparatus 102' configured to perform the functions recited by the aforementioned means. As described supra, the processing system 1314 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for wireless communications, comprising:
transmitting a first message to a user equipment (UE) having a number of physical UE antenna ports, the first message to reconfigure a sounding reference signal (SRS) mode used by the UE; and
indicating in a field in the first message, an SRS transmission port number out of a number of possible SRS transmission port numbers, wherein a first SRS transmission port number corresponds to a first integer that maps to a same antenna or antenna virtualization as a physical uplink shared channel (PUSCH) mode 1 single antenna transmission scheme 1 or 2 using PUSCH transmission port 0, a second SRS transmission port number corresponds to a second integer that maps to a same antenna or antenna virtualization as a PUSCH mode 2 multi-antenna transmission configured with a two-antenna (2Tx) antenna transmission scheme using PUSCH transmission port 0, a third SRS transmission port number corresponds to a third integer that maps to a same antenna or antenna virtualization as a PUSCH mode 2 multi-antenna transmission configured with a 2Tx antenna transmission scheme using PUSCH transmission port 1, a fourth SRS transmission port number corresponds to a fourth integer that maps to a same antenna or antenna virtualization as a PUSCH mode 2 multi-antenna transmission configured with a four-antenna (4Tx) antenna transmission scheme using PUSCH transmission port 0, a fifth SRS transmission port number corresponds to a fifth integer that maps to a same antenna or antenna virtualization as a PUSCH mode 2 multi-antenna transmission configured with a 4Tx antenna transmission scheme using PUSCH transmission port 1, a sixth SRS transmission port number corresponds to a sixth integer that maps to a same antenna or antenna virtualization as a PUSCH mode 2 multi-antenna transmission configured with a 4Tx antenna transmission scheme using PUSCH transmission port 2, and a seventh SRS transmission port number corresponds to a seventh integer that maps to a same antenna or antenna virtualization as a PUSCH mode 2 multi-antenna transmission configured with a 4Tx antenna transmission scheme using PUSCH transmission port 3.

2. The method of claim 1, wherein the SRS mode is either aperiodic or periodic SRS.

3. The method of claim 1, wherein the SRS mode is associated with either a first uplink transmission mode that uses a single antenna port or a second uplink transmission mode that uses multiple antennas ports.

4. The method of claim 1, wherein the SRS mode relates to a timing of SRS transmissions.

5. A method for wireless communications of a user equipment (UE), comprising:
receiving a first message to reconfigure a sounding reference signal (SRS) mode used by the UE, the UE having a number of physical UE antenna ports; and
determining, in response to reception of the first message, an SRS transmission port number, the SRS transmission port number being one of a number of possible SRS transmission port numbers, wherein a first SRS transmission port number corresponds to a first integer that maps to a same antenna or antenna virtualization as a physical uplink shared channel (PUSCH) mode 1 single antenna transmission scheme 1 or 2 using PUSCH transmission port 0, a second SRS transmission port number corresponds to a second integer that maps to a same antenna or antenna virtualization as a PUSCH mode 2 multi-antenna transmission configured with a two-antenna (2Tx) antenna transmission scheme using PUSCH transmission port 0, a third SRS transmission port number corresponds to a third integer that maps to a same antenna or antenna virtualization as a PUSCH mode 2 multi-antenna transmission configured with a 2Tx antenna transmission scheme using PUSCH transmission port 1, a fourth SRS transmission port number corresponds to a fourth integer that maps to a same antenna or antenna virtualization as a PUSCH mode 2 multi-antenna transmission configured with a four-antenna (4Tx) antenna transmission scheme using PUSCH transmission port 0, a fifth SRS transmission port number corresponds to a fifth integer that maps to a same antenna or antenna virtualization as a PUSCH mode 2 multi-antenna transmission configured with a 4Tx antenna transmission scheme using PUSCH transmission port 1, a sixth SRS transmission port number corresponds to a sixth integer that maps to a same antenna or antenna virtualization as a PUSCH mode 2 multi-antenna transmission configured with a 4Tx antenna transmission scheme using PUSCH transmission port 2, and a seventh SRS transmission port number corresponds to a seventh integer that maps to a same antenna or antenna virtualization as a PUSCH mode 2 multi-antenna transmission configured with a 4Tx antenna transmission scheme using PUSCH transmission port 3.

6. The method of claim 5, wherein the SRS mode is either aperiodic or periodic SRS.

7. The method of claim 5, wherein the SRS mode is associated with either a first uplink transmission mode that uses a single antenna port or a second uplink transmission mode that uses multiple antennas ports.

8. The method of claim 5, wherein the SRS mode relates to a timing of SRS transmissions.

9. An apparatus for wireless communications, comprising:
means for transmitting a first message to a user equipment (UE) having a number of physical UE antenna ports, the first message to reconfigure a sounding reference signal (SRS) mode used by the UE; and
means for indicating in a field in the first message, an SRS transmission port number out of a number of possible SRS transmission port numbers, wherein a first SRS transmission port number corresponds to a first integer that maps to a same antenna or antenna virtualization as a physical uplink shared channel (PUSCH) mode 1 single antenna transmission scheme 1 or 2 using PUSCH transmission port 0, a second SRS transmission port number corresponds to a second integer that maps to a same antenna or antenna virtualization as a PUSCH mode 2 multi-antenna transmission configured with a two-antenna (2Tx) antenna transmission scheme using PUSCH transmission port 0, a third SRS transmission port number corresponds to a third integer that maps to a same antenna or antenna virtualization as a PUSCH mode 2 multi-antenna transmission configured with a 2Tx antenna transmission scheme using PUSCH transmission port 1, a fourth SRS transmission port number corresponds to a fourth integer that maps to a same antenna or antenna virtualization as a PUSCH mode 2 multi-antenna transmission configured with a four-antenna (4Tx) antenna transmission scheme using PUSCH transmission port 0, a fifth SRS transmission port number corresponds to a fifth integer that maps to a same antenna or antenna virtualization as a PUSCH mode 2 multi-antenna transmission configured with a 4Tx antenna transmission scheme using PUSCH transmission port 1, a sixth SRS transmission port number corresponds to a sixth integer that maps to a same antenna or antenna virtualization as a PUSCH mode 2 multi-antenna transmission configured with a 4Tx antenna transmission scheme using PUSCH transmission port 2, and a seventh SRS transmission port number corresponds to a seventh integer that maps to a same antenna or antenna virtualization as a PUSCH mode 2 multi-antenna transmission configured with a 4Tx antenna transmission scheme using PUSCH transmission port 3.

10. The apparatus of claim 9, wherein the SRS mode is either aperiodic or periodic SRS.

11. The apparatus of claim 9, wherein the SRS mode is associated with either a first uplink transmission mode that uses a single antenna port or a second uplink transmission mode that uses multiple antennas ports.

12. An apparatus for wireless communications, comprising:
means for receiving a first message to reconfigure a sounding reference signal (SRS) mode used by the apparatus, the apparatus having a number of physical antenna ports; and
means for determining, in response to reception of the first message, an SRS transmission port number, the SRS transmission port number being one of a number of possible SRS transmission port numbers, wherein a first SRS transmission port number corresponds to a first integer that maps to a same antenna or antenna virtualization as a physical uplink shared channel (PUSCH) mode 1 single antenna transmission scheme 1 or 2 using PUSCH transmission port 0, a second SRS transmission port number corresponds to a second integer that maps to a same antenna or antenna virtualization as a PUSCH mode 2 multi-antenna transmission configured with a two-antenna (2Tx) antenna transmission scheme using PUSCH transmission port 0, a third SRS transmission port number corresponds to a third integer that maps to a same antenna or antenna virtualization as a PUSCH mode 2 multi-antenna transmission configured with a 2Tx antenna transmission scheme using PUSCH transmission port 1, a fourth SRS transmission port number corresponds to a fourth integer that maps to a same antenna or antenna virtualization as a PUSCH mode 2 multi-antenna transmission configured with a four-antenna (4Tx) antenna transmission scheme using PUSCH transmission port 0, a fifth SRS transmission port number corresponds to a fifth integer that maps to a same antenna or antenna virtualization as a PUSCH mode 2 multi-antenna transmission configured with a 4Tx antenna transmission scheme using PUSCH transmission port 1, a sixth SRS transmission port number corresponds to a sixth integer that maps to a same antenna or antenna virtualization as a PUSCH mode 2 multi-antenna transmission configured with a 4Tx antenna transmission scheme using PUSCH transmission port 2, and a seventh SRS transmission port number corresponds to a seventh integer that maps to a same antenna or antenna virtualization as a PUSCH mode 2 multi-antenna transmission configured with a 4Tx antenna transmission scheme using PUSCH transmission port 3.

13. The apparatus of claim 12, wherein the SRS mode is either aperiodic or periodic SRS.

14. The apparatus of claim 12, wherein the SRS mode is associated with either a first uplink transmission mode that uses a single antenna port or a second uplink transmission mode that uses multiple antennas ports.

15. A non-transitory computer-readable medium storing computer executable code, comprising code to:
transmit a first message to a user equipment (UE) having a number of physical UE antenna ports, the first message to reconfigure a sounding reference signal (SRS) mode used by the UE; and
indicate in a field in the first message, an SRS transmission port number out of a number of possible SRS transmission port numbers, wherein a first SRS transmission port number corresponds to a first integer that maps to a same antenna or antenna virtualization as a physical uplink shared channel (PUSCH) mode 1 single antenna transmission scheme 1 or 2 using PUSCH transmission port 0, a second SRS transmission port number corresponds to a second integer that maps to a same antenna or antenna virtualization as a PUSCH mode 2 multi-antenna transmission configured with a two-antenna (2Tx) antenna transmission scheme using PUSCH transmission port 0, a third SRS transmission port number corresponds to a third integer that maps to a same antenna or antenna virtualization as a PUSCH mode 2 multi-antenna transmission configured with a 2Tx antenna transmission scheme using PUSCH transmission port 1, a fourth SRS transmission port number corresponds to a fourth integer that maps to a same antenna or antenna virtualization as a PUSCH mode 2 multi-antenna transmission configured with a four-antenna (4Tx) antenna transmission scheme using PUSCH transmission port 0, a fifth SRS transmission port number corresponds to a fifth integer that maps to a same antenna or antenna virtualization as a PUSCH mode 2 multi-antenna transmission configured with a 4Tx antenna transmission scheme using PUSCH transmission port 1, a sixth SRS transmission port number corresponds to a sixth integer that maps to a same antenna or antenna virtualization as a PUSCH mode 2 multi-antenna transmission configured with a 4Tx antenna transmission scheme using PUSCH transmission port 2, and a seventh SRS transmission port number corresponds to a seventh integer that maps to a same antenna or antenna virtualization as a PUSCH mode 2 multi-antenna transmission configured with a 4Tx antenna transmission scheme using PUSCH transmission port 3.

16. The non-transitory computer-readable medium of claim 15, wherein the SRS mode is either aperiodic or periodic SRS.

17. The non-transitory computer-readable medium of claim 15, wherein the SRS mode is associated with either a first uplink transmission mode that uses a single antenna port or a second uplink transmission mode that uses multiple antennas ports.

18. A non-transitory computer-readable medium storing computer executable code, comprising code to:
receive a first message to reconfigure a sounding reference signal (SRS) mode used by a user equipment (UE), the UE having a number of physical UE antenna ports; and
determine, in response to reception of the first message, an SRS transmission port number, the SRS transmission port number being one of a number of possible SRS transmission port numbers, wherein a first SRS transmission port number corresponds to a first integer that maps to a same antenna or antenna virtualization as a physical uplink shared channel (PUSCH) mode 1 single antenna transmission scheme 1 or 2 using PUSCH transmission port 0, a second SRS transmission port number corresponds to a second integer that maps to a same antenna or antenna virtualization as a PUSCH mode 2 multi-antenna transmission configured with a two-antenna (2Tx) antenna transmission scheme using PUSCH transmission port 0, a third SRS transmission port number corresponds to a third integer that maps to a same antenna or antenna virtualization as a PUSCH mode 2 multi-antenna transmission configured with a 2Tx antenna transmission scheme using PUSCH transmission port 1, a fourth SRS transmission port number corresponds to a fourth integer that maps to a same antenna or antenna virtualization as a PUSCH mode 2 multi-antenna transmission configured with a four-antenna (4Tx) antenna transmission scheme using PUSCH transmission port 0, a fifth SRS transmission port number corresponds to a fifth integer that maps to a same antenna or antenna virtualization as a PUSCH mode 2 multi-antenna transmission configured with a 4Tx antenna transmission scheme using PUSCH transmission port 1, a sixth SRS transmission port number corresponds to a sixth integer that maps to a same antenna or antenna virtualization as a PUSCH mode 2 multi-antenna transmission configured with a 4Tx antenna transmission scheme using PUSCH transmission port 2, and a seventh SRS transmission port number corresponds to a seventh integer that maps to a same antenna or antenna virtualization as a PUSCH mode 2 multi-antenna transmission configured with a 4Tx antenna transmission scheme using PUSCH transmission port 3.

19. The non-transitory computer-readable medium of claim 18, wherein the SRS mode is either aperiodic or periodic SRS.

20. The non-transitory computer-readable medium of claim 18, wherein the SRS mode is associated with either a first uplink transmission mode that uses a single antenna port or a second uplink transmission mode that uses multiple antennas ports.

21. An apparatus for wireless communications, comprising:
a memory; and
a processing system coupled to the memory and configured to:
transmit a first message to a user equipment (UE) having a number of physical UE antenna ports, the first message to reconfigure a sounding reference signal (SRS) mode used by the UE; and
indicate in a field in the first message, an SRS transmission port number out of a number of possible SRS transmission port numbers, wherein a first SRS transmission port number corresponds to a first integer that maps to a same antenna or antenna virtualization as a physical uplink shared channel (PUSCH) mode 1 single antenna transmission scheme 1 or 2 using PUSCH transmission port 0, a second SRS transmission port number corresponds to a second integer that maps to a same antenna or antenna virtualization as a PUSCH mode 2 multi-antenna transmission configured with a two-antenna (2Tx) antenna transmission scheme using PUSCH transmission port 0, a third SRS transmission port number corresponds to a third integer that maps to a same antenna or antenna virtualization as a PUSCH mode 2 multi-antenna transmission configured with a 2Tx antenna transmission scheme using PUSCH transmission port 1, a fourth SRS transmission port number corresponds to a fourth integer that maps to a same antenna or antenna virtualization as a PUSCH mode 2 multi-antenna transmission configured with a four-antenna (4Tx) antenna transmission scheme using PUSCH transmission port 0, a fifth SRS transmission port number corresponds to a fifth integer that maps to a same antenna or antenna virtualization as a PUSCH mode 2 multi-antenna transmission configured with a 4Tx antenna transmission scheme using PUSCH transmission port 1, a sixth SRS transmission port number corresponds to a sixth integer that maps to a same antenna or antenna virtualization as a PUSCH mode 2 multi-antenna transmission configured with a 4Tx antenna transmission scheme using PUSCH transmission port 2, and a seventh SRS transmission port number corresponds to a seventh integer that maps to a same antenna or antenna virtualization as a PUSCH mode 2 multi-antenna transmission configured with a 4Tx antenna transmission scheme using PUSCH transmission port 3.

22. The apparatus of claim 21, wherein the SRS mode is either aperiodic or periodic SRS.

23. The apparatus of claim 21, wherein the SRS mode is associated with either a first uplink transmission mode that uses a single antenna port or a second uplink transmission mode that uses multiple antennas ports.

24. An apparatus for wireless communications, comprising:
a memory; and
a processing system coupled to the memory and configured to:
receive a first message to reconfigure a sounding reference signal (SRS) mode used by the apparatus, the apparatus having a number of physical antenna ports; and
determine, in response to reception of the first message, an SRS transmission port number, the SRS transmission port number being one of a number of possible SRS transmission port numbers, wherein a first SRS transmission port number corresponds to a first integer that maps to a same antenna or antenna virtualization as a physical uplink shared channel (PUSCH) mode 1 single antenna transmission scheme 1 or 2 using PUSCH transmission port 0, a second SRS transmission port number corresponds to a second integer that maps to a same antenna or antenna virtualization as a PUSCH mode 2 multi-antenna transmission configured with a two-antenna (2Tx) antenna transmission scheme using PUSCH transmission port 0, a third SRS transmission port number corresponds to a third integer that maps to a same antenna or antenna virtualization as a PUSCH mode 2 multi-antenna transmission configured with a 2Tx antenna transmission scheme using PUSCH transmission port 1, a fourth SRS transmission port number corresponds to a fourth integer that maps to a same antenna or antenna virtualization as a PUSCH mode 2 multi-antenna transmission configured with a four-antenna (4Tx) antenna transmission scheme using PUSCH transmission port 0, a fifth SRS transmission port number corresponds to a fifth integer that maps to a same antenna or antenna virtualization as a PUSCH mode 2 multi-antenna transmission configured with a 4Tx antenna transmission scheme using PUSCH transmission port 1, a sixth SRS transmission port number corresponds to a sixth integer that maps to a same antenna or antenna virtualization as a PUSCH mode 2 multi-antenna transmission configured with a 4Tx antenna transmission scheme using PUSCH transmission port 2, and a seventh SRS transmission port number corresponds to a seventh integer that maps to a same antenna or antenna virtualization as a PUSCH mode 2 multi-antenna transmission configured with a 4Tx antenna transmission scheme using PUSCH transmission port 3.

25. The apparatus of claim 24, wherein the SRS mode is either aperiodic or periodic SRS.

26. The apparatus of claim 24, wherein the SRS mode is associated with either a first uplink transmission mode that uses a single antenna port or a second uplink transmission mode that uses multiple antennas ports.

* * * * *